United States Patent [19]
Choi

[11] Patent Number: 5,283,703
[45] Date of Patent: Feb. 1, 1994

[54] VIDEO CASSETTE RECORDER USABLE VIDEO TAPE HAVING OPPOSED MAGNETIC RECORDING SURFACES AND A DRUM MOVABLE MEANS

[75] Inventor: Seung-lyul Choi, Suwon, Rep. of Korea

[73] Assignee: SamSung Electronics Co., Ltd., Suwon, Rep. of Korea

[21] Appl. No.: 897,770

[22] Filed: Jun. 12, 1992

[30] Foreign Application Priority Data

Jun. 19, 1991 [KR] Rep. of Korea ............... 91-10191

[51] Int. Cl.⁵ .................................... G11B 5/027
[52] U.S. Cl. ........................... 360/85; 358/335
[58] Field of Search .............. 360/33.1, 64, 83, 84, 360/85, 32, 70; 358/342, 313, 225, 335, 906, 909

[56] References Cited

U.S. PATENT DOCUMENTS

| | | | |
|---|---|---|---|
| 3,592,478 | 7/1971 | Cole | 360/83 |
| 4,669,002 | 5/1987 | Nishioka et al. | 360/84 |
| 4,851,940 | 7/1989 | Saito | 360/84 |

*Primary Examiner*—Edward P. Westin
*Assistant Examiner*—Que T. Le
*Attorney, Agent, or Firm*—Rober E. Bushnell

[57] ABSTRACT

The present invention relates to a video cassette recorder (VCR) system capable of recording on or reproducing from opposed surfaces of a magnetic video tape for enhancing an effiency of utilization of the tape and for embodying a variety of pictures on the tape. The recorder further comprises a back head drum for using the video tape having opposed front and back surfaces formed with magnetized layers, in addtion to an ordinary front head drum and a drive means for controlling the front and back head drums. The recorder can record and reproduce desired signal on or from the surfaces of the video tape for embodying a variety of pictures.

19 Claims, 4 Drawing Sheets

VIDEO CASSETTE RECORDER USABLE VIDEO TAPE HAVING OPPOSED MAGNETIC RECORDING SURFACES AND A DRUM MOVABLE MEANS

BACKGROUND OF THE INVENTION

1. Field of the Invention

The present invention relates to a video cassette recorder (VCR) system capable of recording on or reproducing from opposed surfaces of a magnetic video tape for enhancing an effiency of the utilization of the tape and for embodying a variety of pictures on the tape.

2. Description of the Prior Art

A video cassette recorder system generally employs a magnetic tape as a recording medium on or from which a variety of picture are recorded or reproduced by the VCR.

The magnetic tape as a typical recording medium has a magnetized layer formed on a surface of a base film, and the magnetized layer is recorded with picture images, audio signals and/or desired character signals. Accordingly, in the conventional video tape, only one-side surface is used in order to prevent the recorded signals from being damaged.

Recently, however, with the development of a magnetic substance and, hence, the enhancement of the quality of the video tape, an effort has been made to place the magnetized layers onto opposed sides of the base film so as to provide signal recordation to or reproduction from the opposed surfaces of the video tape. In this connection, the picture image must be recorded on or reproduced from the tape by a plurality of head mounted on a head drum in order to use the surfaces of the video tape-herefore, it is necessary to a control means and mechanical arrangement for controlling loading of the tape and operating of the head drum. But, practical method and mechanism for using the surfaces of the tape have not provided yet. At this point, an efficiency of utilization of the existing magnetic tape is necessarily decreased. Also, since the signals are recorded only one surface of the tape, the reproduction of a variety of pictures cannot be ensured due to limitation of an amount of data to be recorded on the tape.

SUMMARY OF THE INVENTION

Accordingly, an object of the present invention is to provide a method of recording and reproducing on or from two opposed surfaces of a video tape in a video cassette recorder and a circuit for embodying the same, wherein a desired signal is recorded or reproduced on or from one surface (front surface) of the video tape by means of an existing head drum including a plurality of heads while an additional signal is recorded-or reproduced on or from the other surface (back surface) of the video tape, while a picture signal is recorded to or reproduced from the other surface by means of a compact movable head drum, enhancing an efficiency of utilization of the magnetic veideo tape.

Another object of the present invention is to provide a video cassette recorder usable a video tape having two surfaces coated with magnetic material to record a variety of differential signals thereon to thereby ensure a variety of pictures in reproducing the tape.

In order to achieve the objects, according to the present invention provides a video cassette recorder usable a video tape having two recording layers formed on both sides of the tape, the recorder comprising : a front head drum for recording or reproducing a desired signal on or from a front surface of the video tape a back head drum for recording or reproducing a desired signal on a back surface of the video tape a drum movable means for moving the back head drum toward the back surface of the video tape to closely contact therewith ; and, a control means for controlling the front and back head drums and the drum movable means to record or reproduce the signals on or from the both surfaces of the video tape.

The above and other objects, features and advantages will be apparent from the following description taken with reference to the accompanying drawings.

DETAILED DESCRIPTION OF THE PREFERRED EMBODIMENT

A preferred embodiment of the present invention will be described now with reference to the accompanying drawings.

Figure 1:
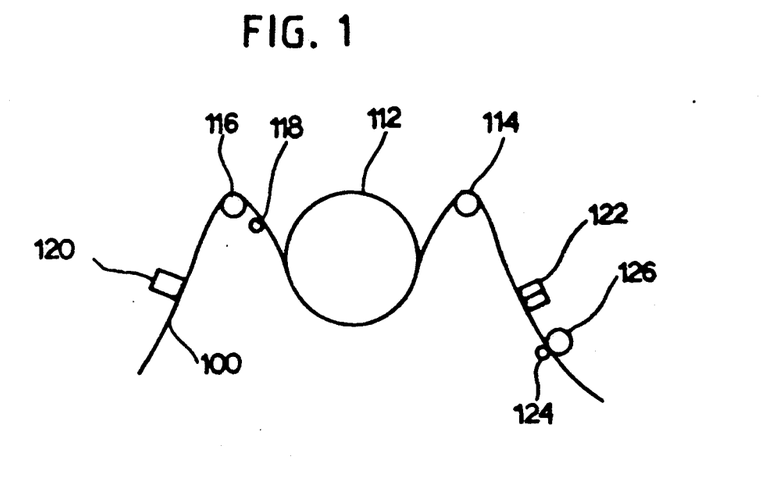
FIG. 1 is a schematic plane view showing a tape feeding assembly of a
video cassette recorder usable opposed surfaces of a video tape according to the present invention.

Referring to FIG. 1, there is shown a schematic palne view of a video cassette recorder for using opnaised recording surfaces of a magnetic video tape according to the present invention. In the drawing, a front head drum 112 records or reproduces desired the signal on or from one of the surface, namely, front surface, of the tape 100 while a back head drum 114 records or reproduces desired signal on or from the other surface, that is a back surface of the tape 100.

More particularly, the magnetic tape 100 is closely contacted to the front head drum 112 by means of a tape supply-side guide roller 116, a slant guide 118 and the back head drum 114.

meanwhile, an erasable head 120 and an A/C head 122 are disposed at a front of the supply and take-up sides of the video tape 100, respectively. Also, at the take-up side of the tape 100 as viewed from the A/C head 122, a capstan 124 and a pinch roller 116 are disposed at the front and back surfaces of the tape 100 to run-out the latter toward the take-up side of the video tape, respectively.

Accordingly, when the magnetic tape 100 is closely contacted to the front head drum 112 by means of the guide roller 116, the slant guide 118 and the back head drum 114 and the capstan is then rotated in a given direction, the magnetic tape 100 runs in a take-up direction by the capstan 124 and the pinch roller 126 closely contacted thereto. Upon the run of the magnetic tape, the front and back head drums 112 and 114 are also rotated by a VCR driving means (not shown) for recording or reproduing the singals on or form the front or back surface of the magnetic tape 100, respectively.

The front head drum 112 records the desired signal, for example, a video signal having a large quantity of data onto the front surface of the magnetic tape 100, or reproduces the signals recorded on the front surface of the matgnetic tape 100. Alternatively, the back head drum 114 which is in size smaller than the front head drum 112 records or reproduces the desired signal, for example, an audio signal or character signal, having a lower quantity of data, on or from the back surface of the tape 100.

Figure 2:
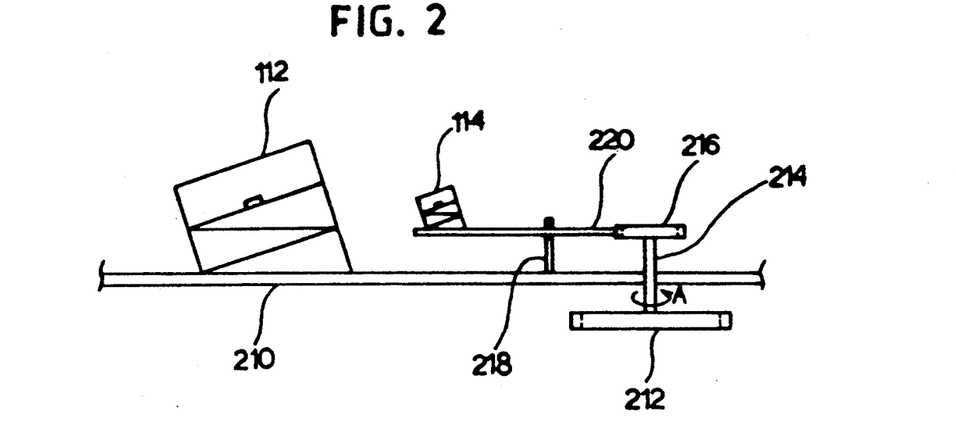
FIG. 2 is a side cross sectional view showing a head drum in the video cassette recorder accoring to the present invention.

Referring now FIG. 2, there is shown a side cross-section view of a video cassette recorder usable the surfaces of the tape according to the present invention, which has the front and back head drums 112 and 114 and a drum movable means for moving the back head drum 114.

With the construction shown in FIG. 2, a main drum movable means has a first gear 212 disposed at an lower side of a main sash 210, the first gear 212 having a shaft 214 upwardly elongated from the lower portion of the sash 210 supporting the entire portions of the video cassette recorder, and a second gear 216 connected to the shaft 214 of the first gear 212 for rotating in co-operation relationship with the first gear 212. The main drum movable means also includes a rotatable shaft 220 enaged with the second gear 216, the shaft 220 is rotated rightly or leftly about a hinge 218 by a rotation of the second gear 216 so as to move the back head drum disposed on an upper surface thereof.

More particularly, on the upper surface of the rotatable shaft 220 is provided the back head drum 114 for recording or reproducing desired data signal on or from the back surface of the magnetic tape 100. The front head drum 112 is disposed on the upper surface of the main sash 210 in the same manner with an ordinary VCR head drum. The back head drum 114 means is disposed on the rotatable shaft with the same gradient as that of the front head drum 112. The hinge 218 is fixedly mounted on the main sash 210. The drum movable means is controlled by a control means (not shown). This control means also controls a driving state of the drum movable means and that of the front and back head drums 112 and 114 so as to record or reproduce the desired signals, for example, on or from the video signal, audio signal, character data and the like tape 100.

The first gear 212 of the drum movable means is rotated in a linkage manner with a gear master cam (not shown) forming the first gear 212. In this case, the gear master cam is composed of a conventional master cam for driving the pinch roller. The first gear 212 is rotated by a separate motor which is controlled by the control means. Also, the first gear 212 can be rotated by using an other motive power source.

Accordingly, when the tape is loaded into the VCR, the first gear 212 is rotated in a direction indicated by the arrow A in the drawing, together with an operation of the gear master cam, and a rotation force of the first gear 212 is transferred to the second gear 216 through the shaft 214.

Consequently, if the second gear 216 is rotated, then the drum movable shaft 220 is backwardly rotated centering around the hinge 218. Upon the rotation of the drum movable shaft 220, the back head drum 114 mounted on the upper portion of the shaft 220 draws the tape 100 (see FIG. 1) together with the supply-side guide roller 116 and slant guide 118 (see FIG. 1) and closely contacts the tape 100 to the front head drum 112. Sequentially, the front and back head drum 112 and 114 are rotated by means of the VCR driving means (not shown) to record or reproduce the signals of or from the opposed surfaces of the magnetic tape 100.

Figure 3:
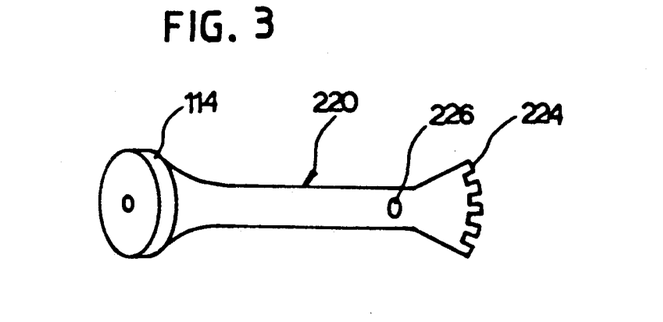
FIG. 3 is a plane view of a drum movable shaft having a back head drum disposed thereon shown in FIG. 2.

Referring to FIG. 3, there is shown a plane view of the drum movable shaft 220 having the back head drum 114 shown mounted thereon, shown in FIG. 2.

In FIG. 3, on one side of the drum movable shaft 220, the back head drum 114 is disposed to record or reporduce the signal on or from the back surface of the magnetic tape 100, and on the other side of the shaft 220, a sector gear 224 is formed. A hole 226 is formed between the sector gear 224 and the portion formed with the back head drum 114 for rotatably accommodating the hinge fixedly mounted on the main sash.

Figure 4A:
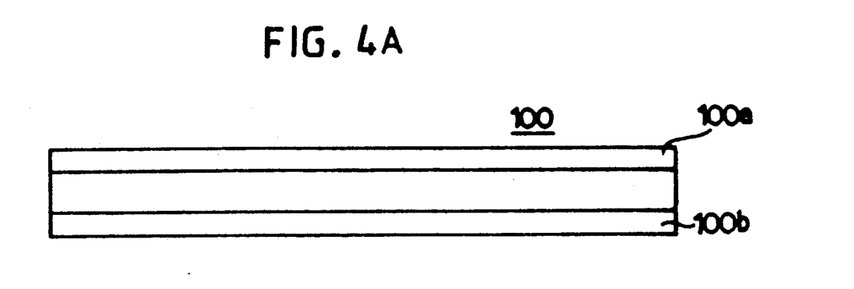
FIGS. 4A to 4C are view of a magnetic video tape having the opposed surfaces according to the present invention, wherein 4A is a side view of the tape having magnetized layers formed on the surfaces, 4B is a front side view of the tape recorded with desired signal by a front head drum, and 4C is a back side view of the tape recorded with desired signal by a back head drum.
Figure 4B:
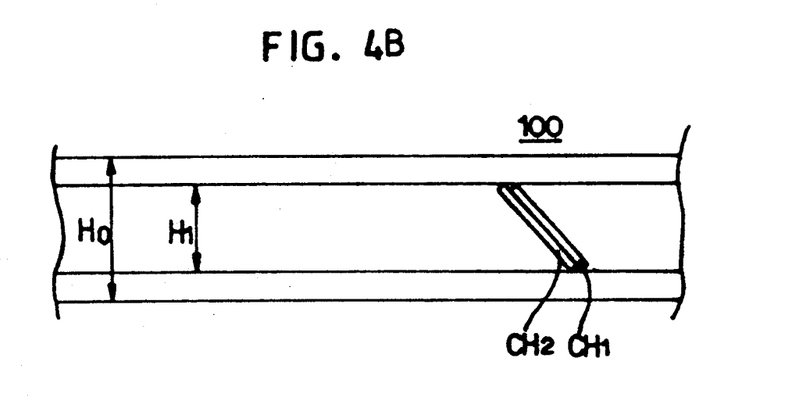
Figure 4C:
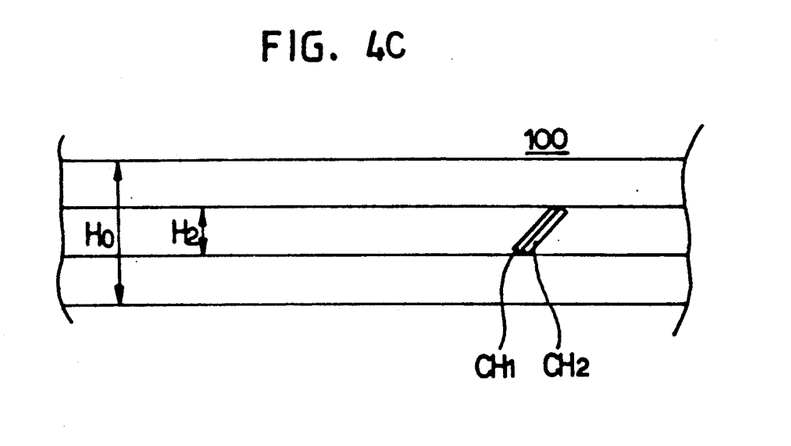

FIG. 4 shows differential formats of the magenetic tape 100 having two surfaces enable to be used by the video cassette recorder, wherein 4A is a side view of the tape having magnetized layers formed on the front and back surfaces thereof, 4B is a front view of the tape recorded with the signal by means of the front head drum (112), and 4C is a back side view of the tape recorded with the signal by means of the back head drum 114.

Referring firstly to FIG. 4A, the magnetic tape 100 has the magnetized layers 100a and 100b formed on the opposed front and back surfaces thereof. On the magnetized layer 100a of the magnetic tape 100, the signals such as image signal, audio signal and control signal are recorded while on the magnetized layer 100b the character data signal is recorded.

Referring to FIG. 4B, the signals are recorded on the front surface of the magnetic tape 100 having a width Ho of generally 12.65 mm by means of the heads mounted on the front head drum (designated at 112 in FIGS. 1 and 2). In this case, the entire width of a signal recording area, occupied by video tracks CH1 and CH2 to be recorded with the signal by means of the front head drum 112, is generally set to 10.6 mm in size.

Referring now to FIG. 4C, the signals are recorded on the back surface of the magnetic tape 100 having a width Ho of generally 12.65 mm by heads mounted on the back head drum (designated at 114 in FIGS. 1 and 2). Here, the entire width $H_2$ occupied by the video tracks CH1 and CH2 to be recorded with the signal by means of the back head drum 114 is smaller then that $H_1$ shown in FIG. 4B (that is $H_1 Y E H_2$), because the track length defined by the rotation of the head mounted on the back head drum having in size smaller than the front head drum is small.

Figure 5:
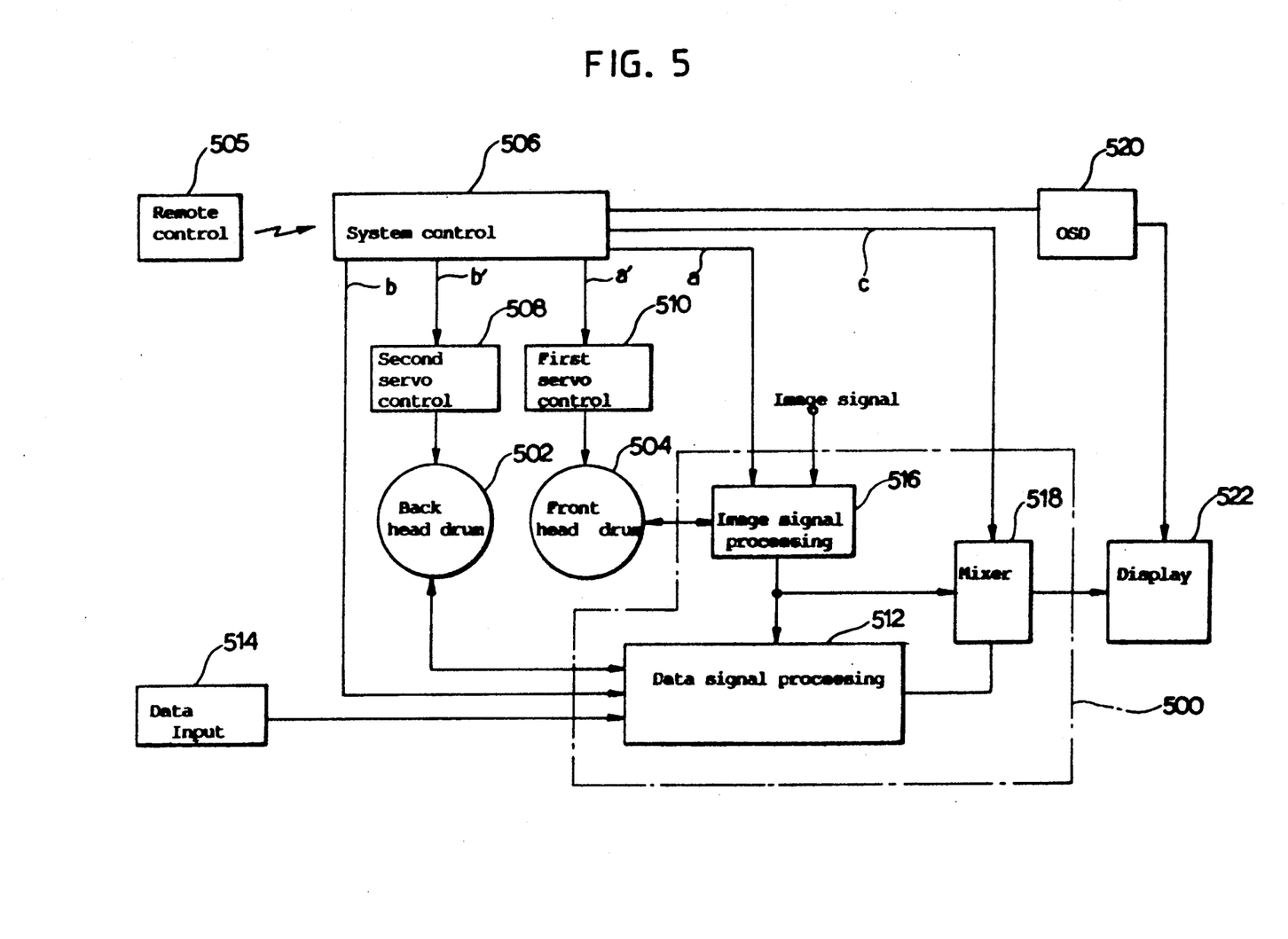
FIG. 5 is a block diagram showing main parts of the video cassette recorder according to the present invention; and, FIG. 6 is a flow chart illustrating an operation sequence of the video cassette recorder according to the present invention.

FIG. 5 shows a block diagram of the video cassette recorder utilizing two surfaces of the magnetic tape 100. In this drawing, the back head drum 502 records the signal on the back surface of the magnetic video tape 100 and reproduces the signal recorded on the video tape 100. A system control means, generally designated at 506, controls the entire video cassette recorder system in accordance with the control signal input from a key input means including, for example, a remote controller 505. Further, first and second servo control means, generally designated at 508 and 510, control the drive of the front and back head drums 502 and 504 under a control of the system control means 506.

In a signal processing means 500, a data signal processing means 512 processes the character signal inputted from the data input means 514 and outputs the processed signal to the back head drum 502 so as to record the signal on the back surface of the video tape 100 under a control of the system control means 506. The data signal processing means 512 also appropriately processes and outputs the signal reproduced from the video tape 100. An image signal processing means 516 appropriately processes the input image signal and outputs the processed image signal to the front head drum 504 so as to record the image signal on the front surface of the video tape 100. Further, the image signal processing means 516 also appropriately processes and outputs the signal reproduced from the front surface of the video tape 100. And, a mixer 518 comprising an ordinary mixer mixes the output of the data signal processing means 512 with that of the image signal processing means 516 and outputs the mixed output to a display unit 522. In addition, an on-screen display (OSD) unit (520) appropriately processes a control state of the system control means 506 into character signal and outputs the character signal to the display unit 522 so as to indicate the control state of the system.

Now, an operation of the video cassette recorder system constructed as mentioned above will be described in detail.

Referring again to FIG. 5, if a recording key of the remote control 505 is selected by an user in order to record the image signal on the video tape, then the system control means 506 outputs control signals a and a' to the image signal processing means 516 and servo control means 510 in the signal processing means 500. The image signal processing means 516 outputs the input image signal to the front head drum 504 in accordance with the control signal a from the system control means 506. At this time, the first servo control means 510 drives the front head drum 504 for recording the image signal supplied through the image signal processing means 516 onto the front surface of the video tape 100.

In order to record data, for example, characters and/or the like onto the back surface of the video tape 100, such data is entered to the data signal processing means 512 through the data input means 514 allowable to be handled by the user.

The data signal processing means 512 appropriately porocesses the input data entered through the data input means 514 and stores the processed data into an internal memory thereof.

Under the condition, if a back surface recording key of the remote control 505 is selected by the user, a key signal corresponding to the selected key is output from the remote control 505 and the key signal is then entered to the system control means 506 which outputs the control signals b and b' according to the key input of the remote control 505. Consequently, the data signal processing means 512 synchronously outputs data such as character signal and etc restored in the memory, with the image signal input from the image signal processing means 516 to the back head drum 502 in accordance with the control signal b.

At this time, the second servo control means 508 drives the back head drum 502 in accordance with the control signal b' entered from the system control means 506 to record data, such as character data, processed by the data signal processing means 512 on the back surface of the video tape 100.

Meanwhile, if a reproduction key of the remote control 505 is pressed to reproduce the signal recorded on the video tape 100, then the reproduction start signal produced from the remote control 505 is entered to the system control means 506. Upon the input of the reproduction start signal, the system a' and/or b' to the first and/or second servo system control means 508 and/or 510 to drive the back and/or front head drum 502 and/or 504. Accordingly, the front or back head drum 504 or 502 is driven according to the control signal a' or b' to reproduce the signal recorded on the front or back surface of the video tape 100. Also, the system control means 506 simultaneously outputs the control signals a and b to the image signal processing means 516 and the data signal processing means 512, which process the signal reproduced by the front and back head drums 504 and 502 on the basis of the control signals a and b, respectively.

A mixer 518 mixes data such as image signal, character signal and the like, outputted from the image signal processing means 516, with that outputted from the data processing means 512 in accordance with a control signal c supplied from the system control means 506. Moreover, the display 522 indicates the image and character signals supplied from the mixer 518.

Accordingly, if date and time are entered by using the data input means 514 in taking a photograph picture of a wedding ceremony then the data signal processing means 512 records the date and time into the internal memory in synchronous with the picture image signal supplied from the image signal processing means 516. Simultaneously, when data, for example, the date and time are recorded on the back surface of the video tape 100 by using the back head drum 502, such data are indicated on the display 522 in alignment with the image signal in reproducing the tape.

Therefore, if the data are recorded with the separatively assigned address while the data are recorded on the back surface of the tape, it is possible to readily search the desired picture by using the previously assigned address at the time of the reproduction of the video tape 100.

The OSD unit 520 generates the control state designated by the remote control 506 into character signal to be indicated on the display unit 522 to the present VCR control state.

Figure 6:
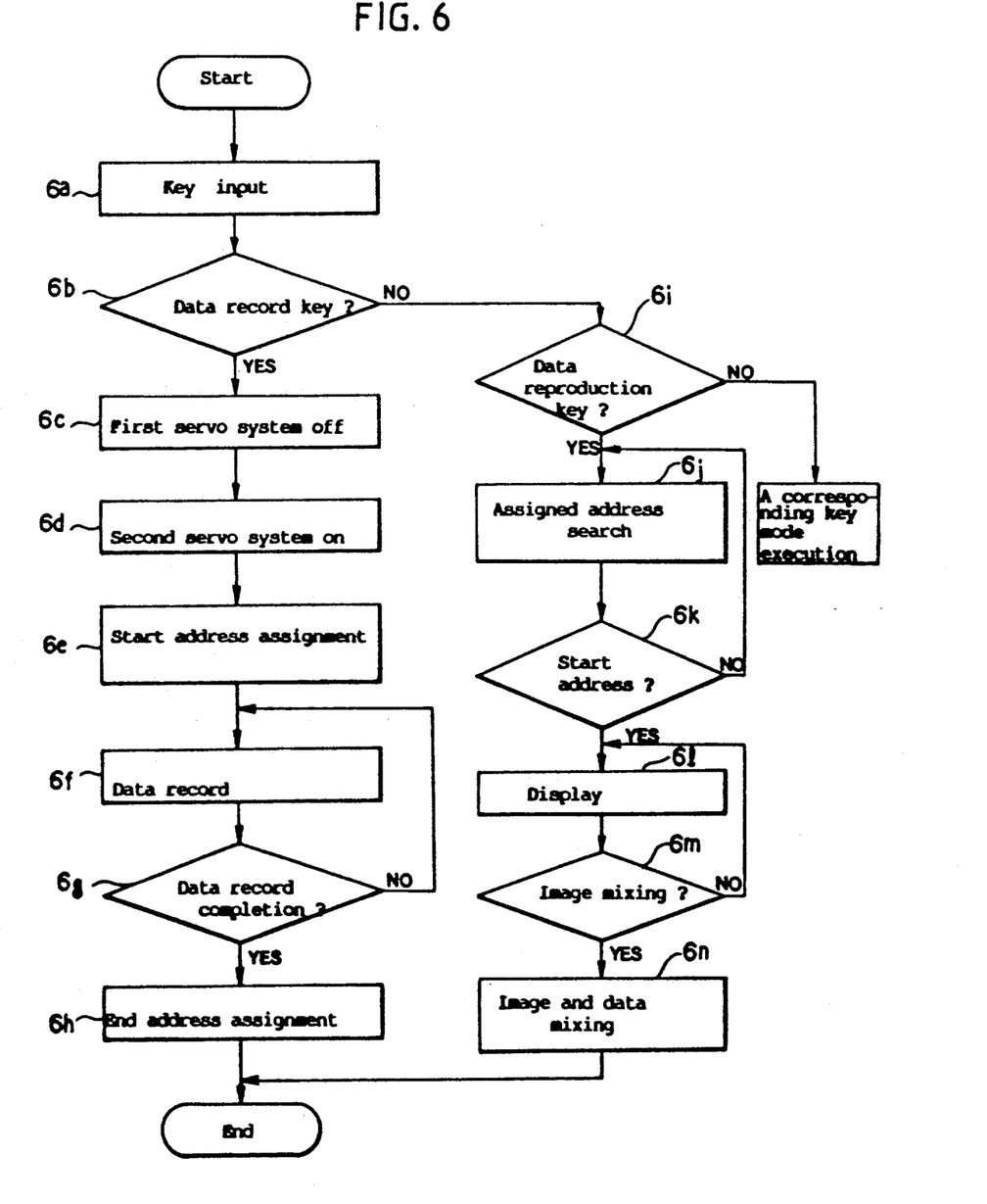

Referring to FIG. 6, there is shown a flowchart illustrating the operation sequence of VCR usable two surfaces of the video tape according to the invention, shown in FIG. 5.

More particularly, if a key signal is entered from the remote control 505 at a step 6a, it is determined whether the input key signal is a data record key input signal or not, at a step 6b. As a result, if it is detected as the data record key signal, then the first servo system for recording or reproducing the image signal on or from the video tape 100 is cutoff at a step 6c while the second servo system is driven at a step 6d. Sequentially, a record area designating address (start address) is assigned at a step 6e and the input data processed as described above are recorded on the back surface of the video tape 100 on the basis of the address, at a step 6f. After recording the data, it is determined that the record of the data are completed, at a step 6g. If the record of the data has been completed, then an end address is assigned to complete the record of data.

Alternatively, if the data record key signal is not entered at the step 6b, it is determined whether or not the key input is a data reproduction key signal, at a step 6i. In this case, if it is not a data reproduction key signal, then a mode selected by an input key is executed.

Meanwhile, if it is a data reproduction key signal, then the assigned address is searched at a step 6j. If the start address is detected under searching the assigned address, at a step 6k, then the data is readed out to display it on the display at a step 6l. If it attempts to output the image signal at same time as the output of the data, at a step 6m, the image and data are mixed with each other at a step 6n.

Accordingly, if data, for example, characters and etc are recorded on the desired area of the video tape 100 in accordance with the assigned address at the time of a preservation of the recorded video tape, then the desired picture image can be readily searched by using the assigned address when the video tape is reproduced, and a condition in photographing can be easily understood on the basis of informations, for example, title of the picture image or a date in relation to the picture image.

As described above, according to the present invention, the video cassette recorder can use the opposed surfaces of the video tape thereby improving an efficiency of tape. In addition, since the signals can be recorded on the opposed surfaces of the video tape, it has an effects that a variety of pictures can be realized out of a limited recording amount of data of the video tape.

Although the present invention has been described with reference to the specified embodiment, it will be apparent that many changes and modifications will be made therein without departing from the spirit and scope of the invention. Particularly, while the back head drum is moved by means of the drum movable shaft, the drum may be moved by using a conventional pole base. Furthermore, even if, according to the specification previously described, the front and back head drums are simultaneously used for recording or reproducing the desired signal on or from the video tape, one of the drums can be selectively operated to perform the record or reproduction of the desired signal or data while keeping idle of the other of them.

What is claimed is:

1. A video cassette recorder, comprising:
   a front head drum for recording and reproducing first desired signals on and from, respectively, a front surface of a video tape;
   a back head drum for recording and reproducing second desired signals on and from, respectively, a back surface of said video tape;
   drum movable means for moving said back head drum toward said back surface of said video tap to closely contact said back surface; and,
   control means for controlling said front head drum, said back head drum and said drum movable means to enable recordation and reproduction of said first desired signals and said second desired signals on and from both surfaces of said video tape.

2. A video cassette recorder according to claim 1, wherein said video tape has two surfaces each having a magnetized layer to receive recordings.

3. A video cassette recorder according to claim 1, wherein said back head drum has a smaller diameter smaller than a diameter of said front head drum.

4. A video cassette recorder according to claim 1, wherein said drum movable means comprises:
   a first gear disposed at an lower side of a main sash, said first gear having a shaft extending upwardly through said main sash;
   a second gear connected to said shaft of said first gear for rotating in cooperative relationship with said first gear; and
   a rotatable shaft engaged with said second gear and carrying said back head drum, said shaft being pivoted on a hinge by rotation of said second gear so as to move said back head drum disposed on an upper surface of said rotatable shaft.

5. A video cassette recorder according to claim 1, wherein said back drum has a smaller diameter than a diameter of said front head drum.

6. A video cassette recorder capable of recording and reproducing signals on and from opposed surfaces of a video tape, said video cassette recorder comprising:
   system control means for controlling said video cassette recorder;
   first and second servo control means controlled by said system control means for controlling driving of front and back head drums;
   means for laterally translating said back head drum to load said video tape around said front head drum; and
   a signal processing means controlled by said system control means for processing received image signals and received data inputted through data input means and generating processed image signals and processed data to be provided to said front and back head drums for recordation onto said video tape, and for processing reproduced data reproduced for said video tape prior to provision to a display unit.

7. A video cassette recording according to claim 6, wherein said signal processing means comprises:
   image signal processing means controlled by said system control means for processing said received image signals;
   data signal processing means controlled by said system control means for processing said received data from said data input means; and
   a mixer for mixing said processed image signals outputted from said image signal processing means with said processed data from said data signal processing means and providing the mixed signal to said display unit.

8. A video cassette recorder according to claim 7, further comprised of said image signal processing means processing said received image signal to record said processed image signal on a front surface of said video tape by using said front head drum, and processing a reproduced image signal reproduced from said front surface of said video tape by using said front head drum prior to said provision to said mixer.

9. A video cassette recorder according to claim 7, further comprises of said data signal processing means processing said received data to record said processed data onto a back surface of said video tape by means of said back head drum, and processing said reproduced data from said back surface of said video tape simultaneously with said image signal processing means processing said received image signal.

10. A video cassette recorder according to claim 8, further comprises of said data signal processing means processing said received data to record said processed data onto a back surface of said video tape by means of said back head drum, and processing said reproduced data from said back surface of said video tape simultaneously with said image signal processing means processing said received image signal.

11. A video cassette recorder, comprising:
   a first head drum for rotatably carrying video heads for reproducing detected image signals from a first surface of a video tape;
   a second head drum for rotatably carrying data heads for reproducing data signals from a second surface of said video tape, said first surface opposing said second surface; and
   drum movable means for translating said second head drum toward said second surface of said video tape to closely contact said second surface during reproduction.

12. A video cassette recorder as claimed in claim 11, wherein said drum movable means is adapted to laterally translate said second head drum into cooperative engagement with said second surface of said video tape.

13. A video cassette recorder as claimed in claim 11, further comprising
   data signal processing means for generating processed data by processing said data signals;
   image signal processing means for generating processed image signals by processing said detected images signals; and
   mixing means for mixing said process data and said processed image signals to generate video signals for display on a display device.

14. A video cassette recorder as claimed in claim 11, further comprising a guide roller and slant guide for guiding said video tape into engagement with said first head drum; wherein said second head drum guides said video tape into full engagement with said first head drum, said second head drum for reproducing from and recording to a back surface of said video tape.

15. A video cassette recorder as claimed in claim 11, wherein said drum movable means comprises a pivoting shaft carrying said second head drum.

16. A video cassette recorder as claimed in claim 11, further comprising a guide roller and slant guide, said guide roller, slant guide, and said second head drum for holding said video tape in engagement with said first head drum, said second head drum for reproducing from and recording to a back surface of said video tape.

17. A video cassette recorder as claimed in claim 12, further comprising a guide roller and slant guide, said guide roller, slant guide, and said second head drum for holding said video tape in engagement with said first head drum, said second head drum for reproducing from and recording to a back surface of said video tape.

18. A video cassette recorder as claimed in claim 15, further comprising a guide roller and slant guide, said guide roller, slant guide, and said second head drum for holding said video tape in engagement with said first head drum, said second head drum for reproducing from and recording to a back surface of said video tape.

19. A video cassette recorder as claimed in claim 16, further comprising
   data signal processing means for generating processed data by processing said data signals;
   image signal processing means for generating processed image signals by processing said detected images signals; and
   mixing means for mixing said process data and said processed image signals to generate video signal for display on a display device.

* * * * *

UNITED STATES PATENT AND TRADEMARK OFFICE
CERTIFICATE OF CORRECTION

PATENT NO. : 5,283,703
DATED : Feb. 1, 1994
INVENTOR(S) : Sueng-lyul Choi

It is certified that error appears in the above-indentified patent and that said Letters Patent is hereby corrected as shown below:

IN THE TITLE

Items

[75], Inventor, correct the Inventor's name to --Sueng-lyul Choi--; and

[56] Last line, change the attorney's first name "Rober" to --Robert--;

Column 1, Line 17, after "of", change "picture" to --pictures--;

Column 2, Line 46, after "schematic", change "palne" to --plane--;

Column 3, Line 62, "an other" should read " to --another--;

UNITED STATES PATENT AND TRADEMARK OFFICE
CERTIFICATE OF CORRECTION

PATENT NO.  : 5,283,703
DATED       : Feb. 1, 1994
INVENTOR(S) : Sueng-lyul Choi It is certified that error appears in the above-indentified patent and that said Letters Patent is hereby corrected as shown below:

| | | |
|---|---|---|
| Column 4, | Line 54, | after "114", change "is" to --being-- and after "smaller", change "then" to --than--; |
| | Line 57, | after "having", change "in" to --a--; |
| | Line 58, | after "drum", delete "is small"; |
| Column 5, | Line 62, | after "etc", insert --.--; |
| Column 6, | Line 49, | between "to" and "the" (the second occurrence), insert --inform--; |
| | Line 68, | after "data", change "are" to --is--; and |
| Column 7, | Line 11, | before "out", change "readed" to --read--: |

UNITED STATES PATENT AND TRADEMARK OFFICE
CERTIFICATE OF CORRECTION

PATENT NO. : 5,283,703
DATED : Feb. 1, 1994
INVENTOR(S) : Sueng-lyul Choi

It is certified that error appears in the above-indentified patent and that said Letters Patent is hereby corrected as shown below:

Column 7,

| | | |
|---|---|---|
| Claim 1, | Line 59, | after "video", change "tap" to --tape--; |
| Column 8, | | |
| Claim 6, | Line 31, | before "signal", delete "a"; and |
| Column 10, | | |
| Claim 19, | Line 35, | after "video", change "signal" to --signals--: |

Signed and Sealed this

Twenty-second Day of July, 1997

Attest:

BRUCE LEHMAN

Attesting Officer

Commissioner of Patents and Trademarks